United States Patent
Tanaka et al.

(10) Patent No.: US 8,743,701 B2
(45) Date of Patent: Jun. 3, 2014

(54) TEST DEVICE AND TEST METHOD FOR MOBILE COMMUNICATION TERMINAL

(75) Inventors: Junya Tanaka, Atsugi (JP); Yasuyuki Matsuyama, Atsugi (JP); Takuma Goto, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 143 days.

(21) Appl. No.: 13/489,512

(22) Filed: Jun. 6, 2012

(65) Prior Publication Data

US 2012/0327782 A1    Dec. 27, 2012

(30) Foreign Application Priority Data

Jun. 27, 2011   (JP) .................................. 2011-141886

(51) Int. Cl.
*H04W 24/06* (2009.01)

(52) U.S. Cl.
USPC .......................................................... 370/241

(58) Field of Classification Search
CPC .............................. H04W 24/06; H04W 24/08
USPC .................................... 370/241; 455/566, 423
See application file for complete search history.

(56) References Cited

U.S. PATENT DOCUMENTS

| | | | |
|---|---|---|---|
| 7,190,978 B2* | 3/2007 | Saikyo et al. | 455/566 |
| 7,974,829 B2* | 7/2011 | Ko | 703/24 |
| 2001/0036201 A1* | 11/2001 | Dieterich et al. | 370/506 |
| 2002/0183054 A1* | 12/2002 | Rimoni et al. | 455/423 |
| 2008/0080536 A1* | 4/2008 | Chhaya et al. | 370/401 |
| 2010/0120371 A1* | 5/2010 | Sato et al. | 455/67.14 |
| 2012/0054324 A1* | 3/2012 | Tada et al. | 709/223 |

* cited by examiner

*Primary Examiner* — Albert T Chou
(74) *Attorney, Agent, or Firm* — Pearne & Gordon LLP (57) ABSTRACT

It is possible to check the settings of multiplex communication for test or the state of multiplex communication during the test. A test device tests whether a mobile communication terminal, which is a test target, performs a communication operation normally and displays a list of at least the address of the mobile communication terminal and information for identifying a communication partner of the mobile communication terminal as multiplex communication related information when the mobile communication terminal performs multiplex communication on a multiplex communication related display unit 6d of a display unit 6.

12 Claims, 6 Drawing Sheets

|  | INFORMATION NOTIFIED BY TERMINAL ||
|---|---|---|
|  | EBI | Linked EBI |
| PDN1 (Default) | 5 | - |
| PDN2 (Dedicated) | 6 | 5 |

(b)

|  | INFORMATION NOTIFIED BY TERMINAL ||| DETERMINATION BY TEST DEVICE |
|---|---|---|---|---|
|  | NSAPI | TI | Linked TI | Linked NSAPI |
| PDP1 (Primary) | 5 | 0 | - | - |
| PDP2 (Secondary) | 6 | 1 | 0 | 5 |

TEST DEVICE AND TEST METHOD FOR MOBILE COMMUNICATION TERMINAL

TECHNICAL FIELD

The present invention relates to a mobile communication terminal test device and a mobile communication terminal test method which perform a communication test for determining whether a mobile communication terminal, such as a newly developed mobile phone, performs a communication operation normally.

BACKGROUND ART

For example, when mobile communication terminals, such as mobile phones, are newly developed, it is necessary to perform a communication test for checking whether the mobile communication terminal communicates with a connection destination (communication destination) normally.

When the communication test is performed, it is difficult to connect the mobile communication terminal, which is the test target, to the connection destination (communication destination) through an actual base station. Therefore, a pseudo base station apparatus having the same function as the actual base station is used to check the communication operations of the mobile communication terminal with the connection destination.

Until a communication line is formed between the mobile communication terminal and the connection destination (communication destination) or a measuring device, the pseudo base station apparatus detects the process of communication and the transition state of the communication with the mobile communication terminal. In addition, until the communication line is disconnected and the communication state returns to the original state after the communication line is formed between the mobile communication terminal and the connection destination (communication destination) or the measuring device, the pseudo base station apparatus detects the process of communication among the mobile communication terminal, the connection destination (communication destination) or the measuring device, and the pseudo base station apparatus and the transition state of the communication. Then, the pseudo base station apparatus displays the detected process and transition state of the communication as a sequence on a display device. For example, Patent Document 1 discloses a pseudo base station apparatus which displays a sequence state or a connection state to facilitate a communication test for a mobile communication terminal.

As such, the use of the above-mentioned pseudo base station apparatus makes it possible for the tester to check the current process and transition state of communication in the mobile communication terminal, which is a test target, among a series of communication test processes from display content. As a result, when an error occurs, it is possible to investigate the cause of the error in a short time.

However, as a mobile communication system used in, for example, mobile phones, GSM (Global System for Mobile Communication) or W-CDMA (Wideband Code Division Multiple Access), which is the communication system according to the related art, has been used. However, in recent years, LTE (Long Term Evolution), which is a next-generation packet switching communication system, has emerged. In the mobile communication, packet data communication has increased sharply.

In the packet communication, multiplex communication is possible. For example, a plurality of communication operations, such as the browsing of a Web page, the transmission and reception of mail, a phone call using packet communication (VoIP: Voice over Internet Protocol or VoLTE: Voice over LTE), can be multiplexed. Therefore, a test device for testing whether the mobile communication terminal performs the multiplex communication normally is needed.

When the multiplex communication is tested, it is important for the tester to check the settings of the multiplex communication for the test or the state of the multiplex communication during the test.

RELATED ART DOCUMENT

Patent Document

[Patent Document 1] JP-A-2006-50567 (Family U.S. Pat. No. 7,190,978B2 and Family Chinese Patent No. 100399753)

DISCLOSURE OF THE INVENTION

Problem that the Invention is to Solve

However, in the pseudo base station apparatus according to the related art disclosed in Patent Document 1, it is difficult to check the settings of the multiplex communication for the test or the state of the multiplex communication during the test.

Therefore, the tester refers to a test sequence called a scenario or the settings of the test device in order to check the settings of the multiplex communication for the test or the state of the multiplex communication during the test. However, in this case, it takes a lot of effort and time.

The invention has been made in view of the above-mentioned problems and an object of the invention is to provide a mobile communication terminal test device and a mobile communication terminal test method capable of checking the settings of multiplex communication for a test or the state of multiplex communication during the test.

Means for Solving Problem

In order to achieve the object, according to an aspect of the invention, there is provided a mobile communication terminal test device (1) including: a transmitting and receiving unit (3) that transmits and receives an RF signal to and from a mobile communication terminal (11), which is a test target; a pseudo base station control unit (4) that simulates an operation of a base station; a display unit (6) that displays information about communication performed by the mobile communication terminal; and a display control unit (5). The communication terminal test device tests whether the mobile communication terminal performs packet data communication with a connection destination through the transmitting and receiving unit and the pseudo base station control unit normally. When the mobile communication terminal performs multiplex communication of the packet data communication with the connection destination through the transmitting and receiving unit and the pseudo base station control unit, the display control unit displays a list of multiplex communication related information including an address of the mobile communication terminal and information for identifying the connection destination on the display unit.

The mobile communication terminal test device according to the above-mentioned aspect may further include a virtual connection destination (12) that simulates the connection destination. The display control unit may display dependency of the packet data communication for each service by logical connection between the mobile communication terminal and the virtual connection destination on the display unit.

In the mobile communication terminal test device according to the above-mentioned aspect, the pseudo base station control unit may include a display information determining unit (13) that determines the dependency on the basis of information included in a packet for each service from the mobile communication terminal.

The multiplex communication may be of a combination of first packet data communication which transmits control information for a predetermined service and second packet data communication which transmits data for the predetermined service. The information included in the packet for each service may include a first identifier for identifying a process and a second identifier for identifying the relation of the process. When a value of the first identifier included in the first packet data communication is equal to a value of the second identifier included in the second packet data communication, the display information determining unit may determine that the dependency is established between the first packet data communication and the second packet data communication.

The mobile communication terminal may perform communication based on a W-CDMA communication standard. The first identifier may be a TI (Transaction Identifier) and the second identifier may be a Linked-TI.

In order to achieve the object, according to another aspect of the invention, there is provided a mobile communication terminal test method that tests whether a mobile communication terminal performs packet data communication with a connection destination normally. The mobile communication terminal test method includes: a step of simulating an operation of a base station and performing communication with a mobile communication terminal (11), which is a test target; and a step of displaying information about communication performed by the mobile communication terminal. When the mobile communication terminal performs multiplex communication of the packet data communication with the connection destination in the communication step, the display step displays a list of multiplex communication related information including an address of the mobile communication terminal and information for identifying the connection destination.

The display step may display the dependency of the packet data communication for each service by logical connection between the mobile communication terminal (11) and a virtual connection destination (12) which simulates the connection destination.

The mobile communication terminal test method according to the above-mentioned aspect may further include a step of determining the dependency on the basis of information included in a packet for each service from the mobile communication terminal (11).

The multiplex communication may be a combination of first packet data communication which transmits control information for a predetermined service and second packet data communication which transmits data for the predetermined service. The information included in the packet for each service may include a first identifier for identifying a process and a second identifier for identifying the relation of the process. When a value of the first identifier included in the first packet data communication is equal to a value of the second identifier included in the second packet data communication, the dependency determining step may determine that the dependency is established between the first packet data communication and the second packet data communication.

The mobile communication terminal may perform communication based on a W-CDMA communication standard. The first identifier may be a TI (Transaction Identifier) and the second identifier may be a Linked-TI.

Advantage of the Invention

According to the invention, it is possible to check the settings of multiplex communication or the state of multiplex communication during a test and easily test the multiplex communication of a terminal.

In addition, even when there is no information directly indicating the dependency of multiplex communication, it is possible to determine the dependency of the multiplex communication and display the dependency such that the tester can know the dependency. Therefore, the tester can easily test the multiplex communication of the terminal after recognizing the dependency of the multiplex communication.

BRIEF DESCRIPTION OF THE DRAWINGS

[FIG. 1]

[FIG. 2]

[FIG. 3]

[FIG. 4]

[FIG. 5]

[FIG. 6]

BEST MODE FOR CARRYING OUT THE INVENTION

Hereinafter, an exemplary embodiment of the invention will be described in detail with reference to the accompanying drawings. The invention is not limited to the embodiment, but all other embodiments, examples, and operating techniques which can be implemented by those skilled in the art on the basis of the embodiments are included in the scope of the invention.

Figure 1:
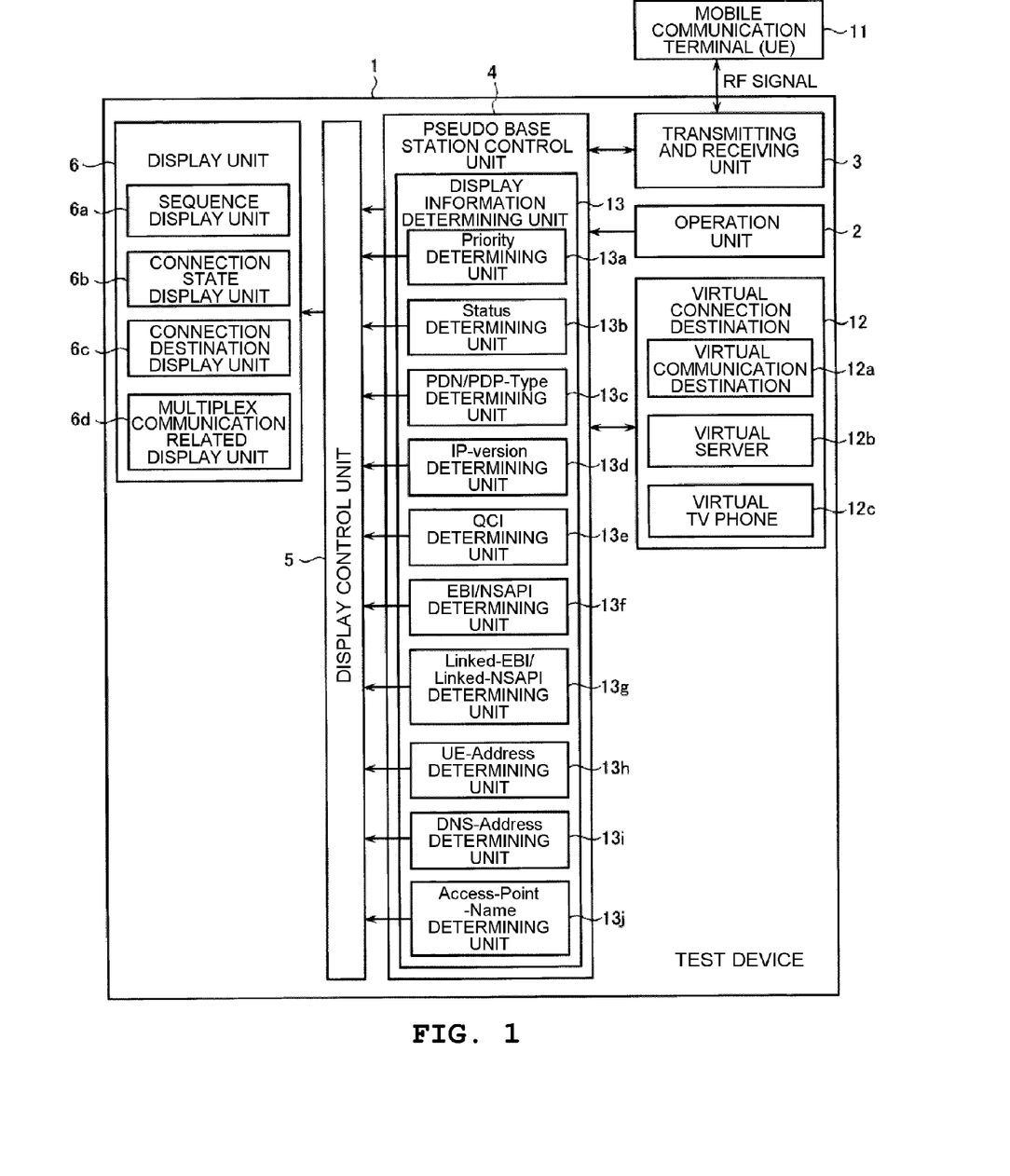
FIG. 1 is a block diagram illustrating the schematic structure of a mobile communication terminal test device according to the invention.
Figure 2:
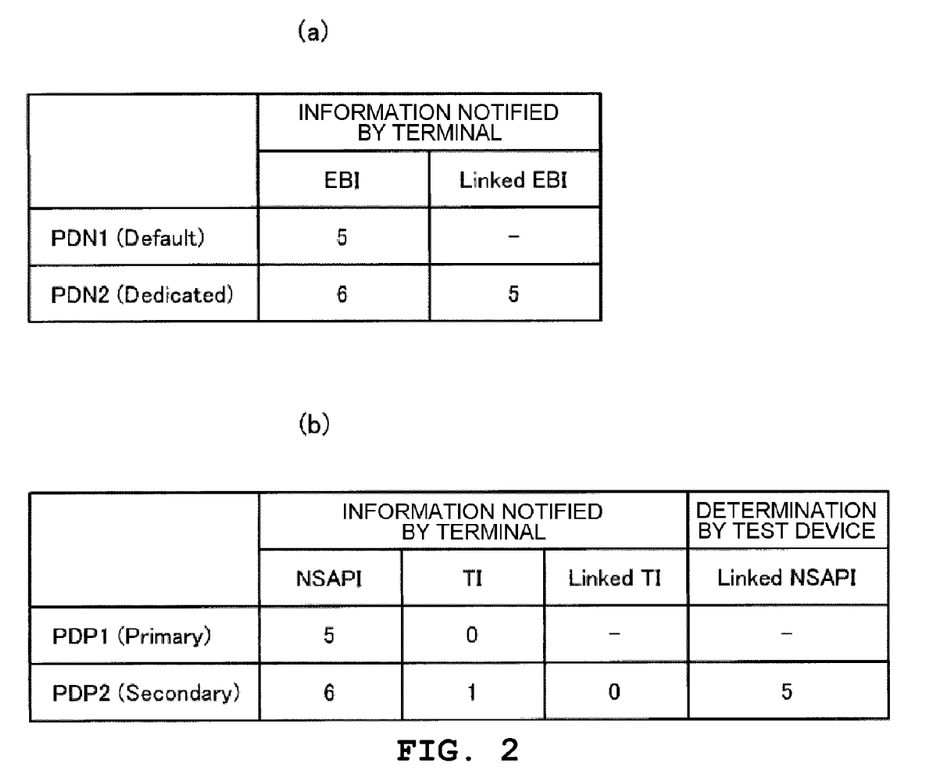
FIG. 2(a) is a diagram illustrating an example of dependency information when a mobile communication terminal sends signals according to an LTE system.
FIG. 2(b) is a diagram illustrating an example of dependency information when the mobile communication terminal sends signals according to a GSM/W-CDMA system.
Figure 3:
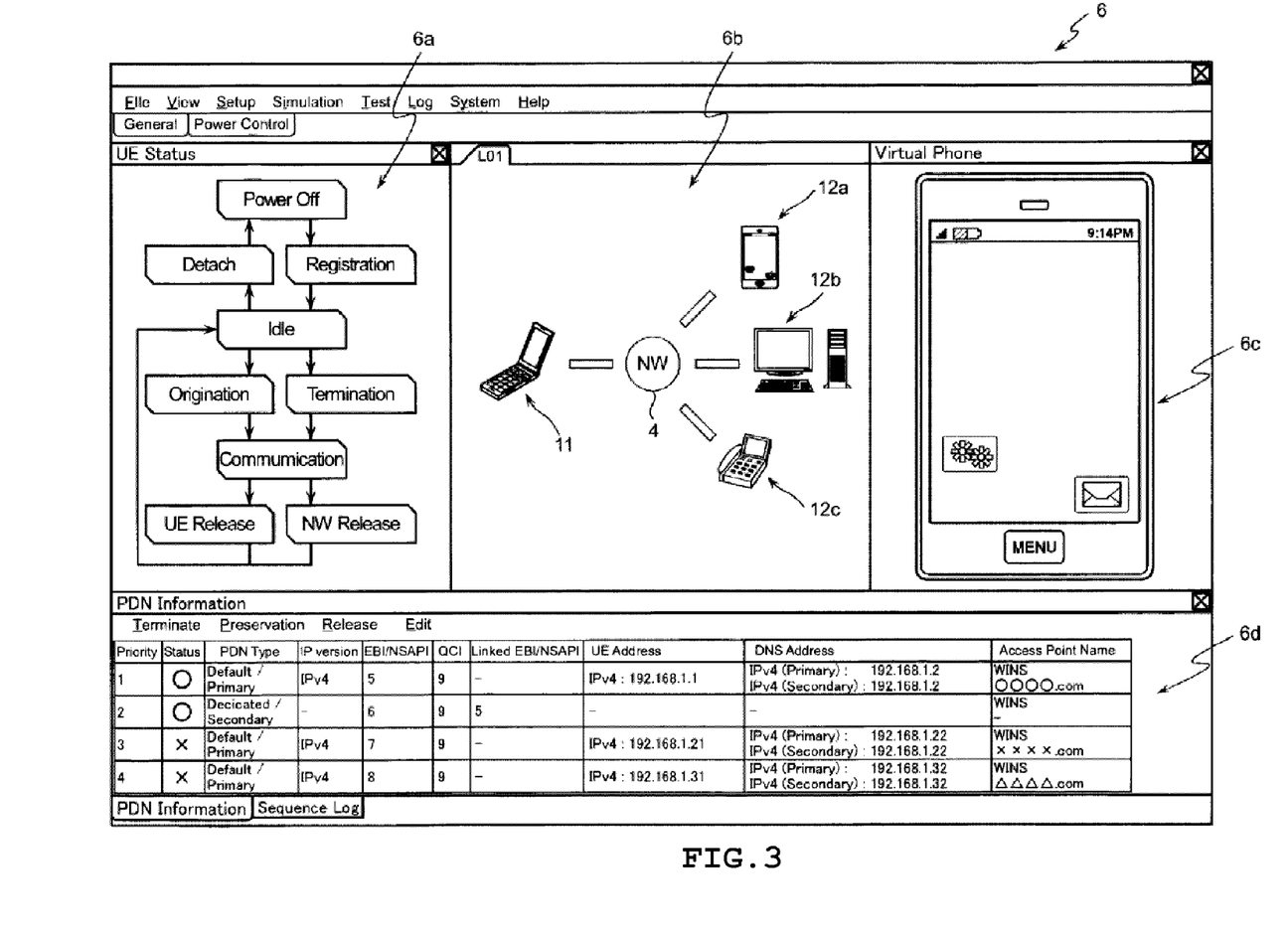
FIG. 3 is a diagram illustrating a detailed example of display by the mobile communication terminal test device and a mobile communication terminal test method according to the invention.
Figure 4:
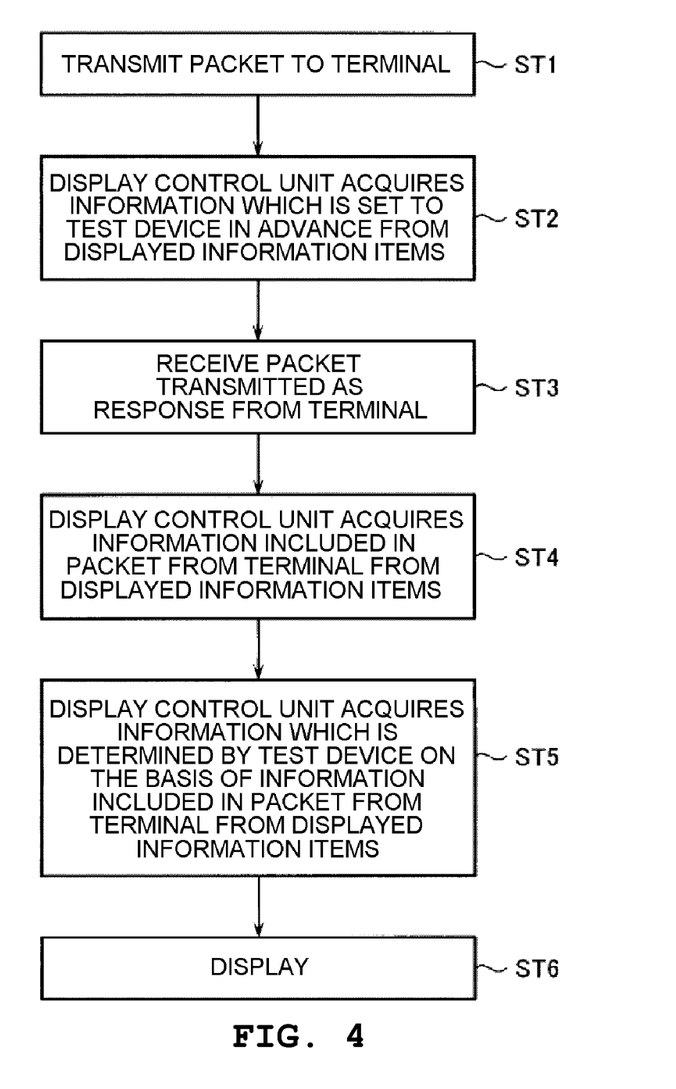
FIG. 4 is a flowchart illustrating an example of the procedure of a display process when a test device sends signals in the mobile communication terminal test device and the mobile communication terminal test method according to the invention.
Figure 5:
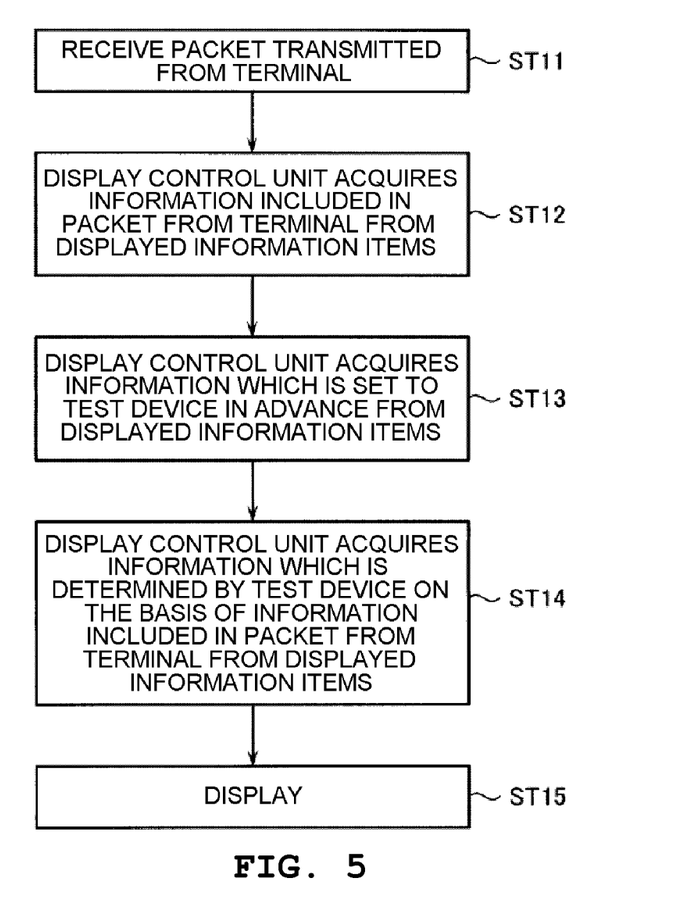
FIG. 5 is a flowchart illustrating an example of the procedure of a display process when the mobile communication terminal sends signals in the mobile communication terminal test device and the mobile communication terminal test method according to the invention.
Figure 6:
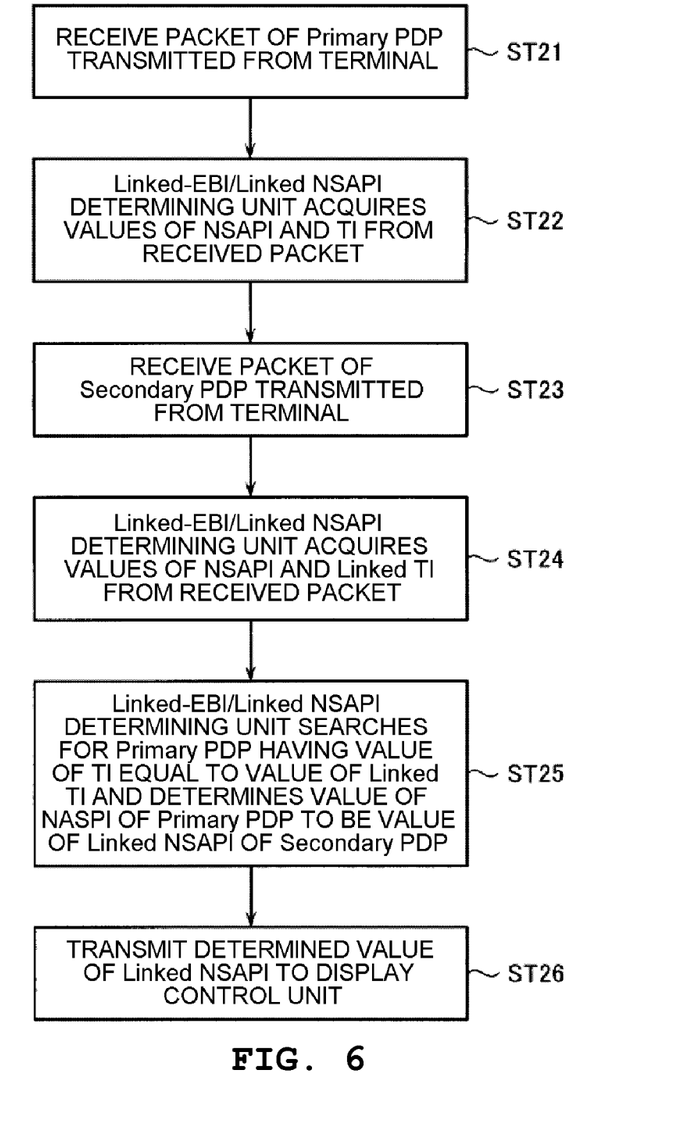
FIG. 6 is a flowchart illustrating an example of a dependency information determining step when the mobile communication terminal sends signals in the mobile communication terminal test device and the mobile communication terminal test method according to the invention.

FIG. 1 is a block diagram illustrating the schematic structure of a mobile communication terminal test device according to an embodiment of the invention. FIG. 2(a) is a diagram illustrating an example of dependency information when a mobile communication terminal sends signals using an LTE system and FIG. 2(b) is a diagram illustrating an example of dependency information when a mobile communication terminal sends signals using a GSM/W-CDMA system. FIG. 3 is a diagram illustrating a detailed example of display by the test device and a test method. FIG. 4 is a flowchart illustrating an example of the procedure of a display process in the test device and the test method when the test device sends signals. FIG. 5 is a flowchart illustrating an example of the procedure of the display process in the test device and the test method when the mobile communication terminal sends signals. FIG. 6 is a flowchart illustrating an example of a dependency information determining process in the test device and the test method when the mobile communication terminal sends signals.

The test device and the test method according to the embodiment of the invention serve as a pseudo base station, and transmit and receive signals (RF signals) to and from a mobile communication terminal, such as a newly developed mobile phone, on the basis of a predetermined communication standard (for example, LTE, GSM, GSM/GPRS, W-CDMA, CDMA2000, TD-SCDMA, WiMAX, or Wi-Fi), thereby testing the communication operation of the mobile communication terminal. In particular, the test device and the test method according to the embodiment of the invention have a display function for checking the state of multiplex communication during the test or the settings of multiplex communication including information indicating the dependency of multiplex communication.

A test device 1 according to this embodiment has a schematic structure including an operation unit 2, a transmitting and receiving unit 3, a pseudo base station control unit 4, a display control unit 5, and a display unit 6 shown in FIG. 1 as components for implementing the display function. Next, the components will be described.

The operation unit 2 is, for example, an operation panel including switches or buttons which are provided on the front surface of the housing of the test device 1. The operation unit 2 selectively sets various items required to test the communication operation of a mobile communication terminal (hereinafter, referred to as a terminal) 11, which is a test target, including instructions to start or stop the communication operation test for the terminal 11 and the setting of various kinds of information required to display a desired image on the display unit 6 (a sequence display unit 6a, a connection state display unit 6b, a connection destination display unit 6c, and a multiplex communication related display unit 6d which will be described below).

The transmitting and receiving unit 3 transmits a signal (RF signal) from a virtual connection destination 12 to the terminal 11, which is a test target, and inputs the signal (RF signal) received from the terminal 11 to the virtual connection destination 12 under the control of the pseudo base station control unit 4.

The virtual connection destination 12 is incorporated into the test device 1, can be connected to the terminal 11 under the control of the pseudo base station control unit 4, and includes, for example, a virtual communication destination 12a, a virtual server 12b, and a virtual TV phone 12c, as shown in FIG. 1.

The pseudo base station control unit 4 controls all of the transmitting and receiving unit 3, the display control unit 5, and the display unit 6 on the basis of the operation information of the operation unit 2 such that a predetermined scenario is performed to test the communication operation of the terminal 11.

A series of operation test processes for simulating a communication sequence on the basis of a communication standard (for example, an LTE standard, a GSM standard, a GSM/GPRS standard, a W-CDMA standard, a CDMA2000 standard, a TD-SCDMA standard, a WiMAX standard, or a Wi-Fi standard) which is predetermined in the test device 1 serving as a pseudo base station is described in the scenario.

The pseudo base station control unit 4 includes a display information determining unit 13 that determines various kinds of display information to be displayed on the multiplex communication related display unit 6d, which will be described below, on the basis of operation information (including setting information) from the operation unit 2 or notice information from the terminal 11 when the terminal 11 performs multiplex communication.

In addition, as shown in FIG. 1, the display information determining unit 13 includes a Priority determining unit 13a, a Status determining unit 13b, a PDN/PDP-Type determining unit 13c, an IP (Internet Protocol)-version determining unit 13d, a QCI determining unit 13e, an EBI (EPS Bearer Identifier)/NSAPI (Network Service Access Point Identifier) determining unit 13f, a Linked-EBI/Linked-NSAPI determining unit 13g, a UE-Address determining unit 13h, a DNS (Domain Name System)-Address determining unit 13i, and an Access-Point-Name determining unit 13j.

The Priority determining unit 13a determines Priority, which is a number for identifying a PDN (Packet Data Network) or a PDP (Packet Data Protocol) in the test device 1. When the terminal 11 sends signals, the test device 1 receives the signals from the terminal 11 and automatically adds the Priority. When the test device 1 transmits signals, the tester operates the operation unit 2 to set the Priority before the signals are transmitted.

The PDN or PDP is logical connection by packet data communication for each service between the terminal (hereinafter, referred to as a UE) 11 and the virtual connection destination 12 through a packet data communication network. The logical connection is called a PDN in the LTE system and is called a PDP in the GSM/W-CDMA system.

The multi-PDP (multi-PDN) includes a plurality of PDPs (PDNs), that is, the multiple connection of PDPs (PDNs), and is mainly divided into the following two types (i) and (ii), which may be mixed with each other.

(i) PDPs by different services are multiplexed. In this case, communication destinations have different IP addresses and the UE is multiply connected to the communication destinations with different IP addresses. Each PDP-Type is primary (default in the LTE system). In addition, in some cases, in addition to the communication destinations, one UE performs multiplex communication using a plurality of IP addresses. In this case, the multi-PDP is used.

(ii) PDPs by the related services are multiplexed. For example, when VoIP (Voice over Internet Protocol) is used to perform voice data communication, the UE exchanges control information (for example, log-in or reception notice information) and voice data with an SIP (Session Initiation Protocol) server. In this case, the control information and the voice data are transmitted on the basis of different PDPs, that is, multiple PDPs. In each PDP-Type, the control information is primary (default in the LTE system) and the voice data is secondary (dedicated in the LTE system).

The VoIP is a technique which compresses a voice using various encoding systems, converts the voice into a packet, and transmits the packet through an IP network in real time. The LTE system is a packet switching communication system and performs communication according to the VoIP.

The SIP is a session control protocol for performing, for example, operations of starting, changing, and ending a session in interactive real-time communication, such as a telephone or a television phone. The SIP server used in the VoIP relays communication between the UEs.

The Status determining unit 13b determines Status indicating a connection state. As shown in FIG. 3, two states, that is, a connection state (a state in which the PDN or PDP is registered) and a disconnection state (a state in which the PDN or PDP is not registered) are displayed as corresponding icons on the multiplex communication related display unit 6c, which will be described below, so as to be discriminated from each other on the basis of the Status determined by the status determining unit 13b under the control of the display control unit 5. The test device 1 determines the status and automatically switches the display of the icons.

The connection state means a state in which an IP address is allocated, and the disconnection state means a state in which no IP address is allocated, but does not mean a state in which communication is not performed. In the actual operation, even when the test device enters a tunnel during communication and wireless communication is cut instantaneously, PDP registration is maintained and communication is resumed after wireless communication is recovered. In some cases, communication is cut by a spontaneous disconnection process or due to a long-term timeout.

The PDN/PDP-Type determining unit 13c determines PDN-Type indicating the type of PDN or PDP-Type indicating the type of PDP.

There are two PDN-Types, that is, a default PDN and a dedicated PDN. There are two PDP-Types, that is, a primary PDP and a secondary PDP.

An example of the PDP-Type will be described below. The primary PDP has an IP address and is a so-called parent PDP. There may be a plurality of primary PDPs.

The secondary PDP does not have an IP address and is a so-called child PDP. Although the primary PDP can exist independently, the secondary PDP is subordinate to the primary PDP. A plurality of secondary PDPs may be subordinate to one primary PDP. In the PDN-Type, the default PDN corresponds to the primary PDN and the dedicated PDN corresponds to the secondary PDN.

The PDN/PDP-Type determining unit 13c determines the value of the PDN-Type or the PDP-Type using different methods, depending on whether the communication standard is LTE or GSM/W-CDMA.

That is, when the communication standard is LTE and the terminal 11 sends signals, the terminal 11 determines and notifies the PDN-Type. Therefore, the PDN/PDP-Type determining unit 13c outputs the notified information to the display control unit 5. When the communication standard is LTE and the test device 1 sends signals, the tester operates the operation unit 2 to set the PDN-Type in advance. The test device 1 can automatically set the PDN-Type.

When the communication standard is GSM/W-CDMA and the terminal 11 sends signals, the terminal 11 determines and notifies the PDN-Type. Therefore, the PDN/PDP-Type determining unit 13c outputs the notified information to the display control unit 5. When the communication standard is GSM/W-CDMA and the test device 1 sends signals, the terminal 11 notifies the PDP-Type and NSAPI in correspondence with Access-Point-Name notified by the test device 1. Therefore, the PDN/PDP-Type determining unit 13c determines the PDN-Type on the basis of the notified information.

The multiplex communication related display unit 6d, which will be described below, displays one of the default (primary) and dedicated (secondary) PDNs or PDFs, for example, in the display format shown in FIG. 3 on the basis of the PDN-Type or PDP-Type determined by the PDN/PDP-Type determining unit 13c under the control of the display control unit 5.

The IP-version determining unit 13d determines IP-version indicating the type of IP. Specifically, when the terminal 11 sends signals, it determines and notifies the IP-version. Therefore, the IP-version determining unit 13d outputs the notified information to the display control unit 5. On the other hand, when the test device 1 sends signals, the tester operates the operation unit 2 to set the IP-version in advance. The test device 1 may automatically set the IP-version.

The multiplex communication related display unit 6d, which will be described below, displays any one of IPv4, IPv6, and IPv4v6, for example, in the display format shown in FIG. 3 on the basis of the IP-version determined by the IP-version determining unit 13d under the control of the display control unit 5.

IPv4v6 means a dual stack. The dual stack is a technique using both IPv4 and IPv6, in which one test device 1 can have both IPv4 and IPv6 addresses and both protocols can be mixed with each other.

The QCI determining unit 13e determines QCI, which is an identification code indicating the class of the service associated with the content of the service. The QCI is determined by the pseudo base station control unit 4 of the test device 1. Therefore, the tester operates the operation unit 2 to set the QCI in advance, regardless of whether the terminal 11 or the test device 1 sends signals. The test device 1 may automatically set the QCI.

The EBI/NSAPI determining unit 13f determines EBI, which is basic information for identifying the PDN, or NSAPI, which is basic information for identifying the PDP, with the ID allocated to the PDN or PDP. EBI/NSAPI is called EBI in the LTE system and is called NSAPI in the GSM/W-CDMA system.

The EBI/NSAPI determining unit 13f determines the value of EBI/NSAPI using different methods, depending on whether the communication standard is LTE or GSM/W-CDMA.

That is, when the communication standard is LTE and the terminal 11 sends signals, the terminal 11 determines and notifies EBI. Therefore, the EBI/NSAPI determining unit 13f outputs the notified information to the display control unit 5. In the example shown in FIG. 2(a), when the communication standard is LTE, the terminal 11 notifies EBI"5" of PDN1 (default) and EBI"6" of PDN2 (dedicated). Therefore, the EBI/NSAPI determining unit 13f outputs information about them to the display control unit 5. When the communication standard is LTE and the test device 1 sends signals, the tester operates the operation unit 2 to set EBI in advance. The test device 1 may automatically set EBI.

On the other hand, when the communication standard is GSM/W-CDMA and the terminal 11 sends signals, the terminal 11 determines and notifies NSAPI. Therefore, the EBI/NSAPI determining unit 13f outputs the notified information to the display control unit 5. In the example shown in FIG. 2(b), when the communication standard is GSM/W-CDMA, the terminal 11 notifies NSAPI"5" of PDN1 (primary) and NSAPI"6" of PDN2 (secondary). Therefore, the EBI/NSAPI determining unit 13f outputs the notified information to the display control unit 5. When the communication standard is GSM/W-CDMA and the test device 1 sends signals, the tester operates the operation unit 2 to set NSAPI in advance. The test device 1 may automatically set NSAPI.

The Linked-EBI/Linked-NSAPI determining unit 13g determines Linked-EBI/Linked-NSAPI on the basis of information set by the operation of the operation unit 2 or information (notice information) included in the packet for each service from the terminal 11. Linked-EBI/Linked-NSAPI is dependency identification information which is allocated only to the secondary PDP (dedicated PDN) and indicates dependency to the primary PDP (default PDN).

The Linked-EBI/Linked-NSAPI determining unit 13g determines the value of Linked-EBI/Linked-NSAPI using different methods, depending on whether the communication standard is LTE or GSM/W-CDMA.

Specifically, when the communication standard is LTE and the terminal 11 sends signals, the terminal 11 determines and notifies Linked-EBI. Therefore, the Linked-EBI/Linked-NSAPI determining unit 13g outputs the notified information to the display control unit 5. In the example shown in FIG. 2(a), when the communication standard is LTE, the terminal 11 notifies Linked-EBI"5" of PDN2 (dedicated). Therefore, the Linked-EBI/Linked-NSAPI determining unit 13g outputs the Linked-EBI"5" to the display control unit 5. When the communication standard is LTE and the test device 1 sends signals, the tester operates the operation unit 2 to set Linked-EBI in advance. The test device 1 may automatically set Linked-EBI.

On the other hand, when the communication standard is GSM/W-CDMA and the terminal 11 sends signals, first, a notice for setting the primary PDP is transmitted and the values of NSAPI and TI (Transaction Identifier: an identifier for identifying a process (process group)) are included in the notice. Then, a notice for setting the secondary PDP is transmitted and the value of Linked-TI is included in the notice. When the value of TI of the primary PDP1 is equal to the value of Linked-TI of the secondary PDP2, a parent-child relationship is established therebetween. The Linked-EBI/Linked-NSAPI determining unit 13g determines the primary PDP to which the secondary PDP notified by the terminal 11 is subordinate on the basis of the parent-child relationship, and determines the value of NSAPI of the primary PDP, which is a parent PDP, to be the value of Linked-TI of the secondary PDP, which is a child PDP. In the example shown in FIG. 2(b), when the communication standard is GSM/W-CDMA, the value of TI of the primary PDP1 and the value of Linked-TI of the secondary PDP2 are equal to each other and are "0". Therefore, the Linked-EBI/Linked-NSAPI determining unit 13g determines that the primary PDP1 and the secondary PDP2 have a parent-child relationship therebetween and determines the value "5" of NSAPI of the primary PDP1, which is a parent PDP, to be the value "5" of Linked-NSAPI of the secondary PDP2, which is a child PDP.

When the communication standard is GSM/W-CDMA and the test device 1 sends signals, the tester operates the operation unit 2 to set Linked-NSAPI in advance. The test device 1 may automatically set Linked-NSAPI.

In this embodiment, in the communication standard GSM/W-CDMA, an identifier corresponding to Linked-EBI in the communication standard LTE is called Linked-NSAPI.

The multiplex communication related display unit 6d, which will be described below, displays the value of EBI or NSAPI of a dependent, for example, in the display format shown in FIG. 3 under the control of the display control unit 5 on the basis of the Linked-EBI or Linked-NSAPI determined by the Linked-EBI/Linked-NSAPI determining unit 13g.

The UE-Address determining unit 13h determines UE-Address, which is the IP address of the terminal 11 to be tested. The IP address of the terminal 11 is determined by the pseudo base station control unit 4 of the test device 1. Therefore, the tester operates the operation unit 2 to set the IP address in advance, regardless of whether the terminal 11 or the test device 1 sends signals. The test device 1 may automatically set the IP address of the terminal 11.

The DNS-Address determining unit 13i determines DNS-Address, which is the address of a DNS server. The tester operates the operation unit 2 to set the DNS-Address in advance. The test device 1 may automatically set the DNS-Address.

The DNS server manages the association between the domain name and the IP address. The test device 1 has a pseudo network function and also simulates a DNS server. Primary and Secondary of the DNS-Address mean a main system and a sub-system (the DNS server generally prepares two or more systems).

The multiplex communication related display unit 6d, which will be described below, displays the address of the DNS server, for example, in the display format shown in FIG. 3 under the control of the display control unit 5 on the basis of the DNS-Address determined by the DNS-Address determining unit 13i.

The Access-Point-Name determining unit 13j determines Access-Point-Name, which is the domain name of the communication service provider. The terminal 11, such as a mobile phone which performs communication through a contract with a specific communication service provider, performs communication through the Access-Point of the communication service provider. The test device 1 has a pseudo network function and also simulates the domain of the communication service provider.

When the terminal 11 sends signals, the terminal 11 determines and notifies the Access-Point-Name. Therefore, the Access-Point-Name determining unit 13j outputs the notified information to the display control unit 5. When the test device 1 sends signals, the tester operates the operation unit 2 to set the Access-Point-Name in advance.

The test device 1 may automatically set the Access-Point-Name. In practice, since the tester, who is a terminal developer, knows the Access-Point-Name notified by the terminal 11, the tester sets the Access-Point-Name to the test device 1.

The display control unit 5 controls the display unit 6 on the basis of a control signal from the pseudo base station control unit 4 based on the set information such that desired display can be performed, for example, in the display format shown in FIG. 3.

The display unit 6 is a display, such as a liquid crystal panel, and includes the multiplex communication related display unit 6d in addition to the sequence display unit 6a, the connection state display unit 6b, and the connection destination display unit 6c disclosed in Patent Document 1.

The sequence display unit 6a displays a plurality of sequences indicating a communication procedure and a communication transition state between the terminal 11 and the virtual connection destination 12, for packet data communication for each service between the terminal 11 and the virtual connection destination 12 through the test device 1.

Specifically, as shown in FIG. 3, the sequence display unit 6a displays a plurality of sequences, such as a "Power Off" sequence indicating the power OFF state of the terminal 11, a "Detach (position deregistration)" sequence indicating the position deregistration state of the terminal 11, a "Registration (position registration)" sequence indicating the position registration state of the terminal 11, an "Idle (standby state)" sequence indicating the standby state of the terminal 11, an "Origination (signal sending)" sequence indicating a state in which the terminal 11 sends signals, a "Termination (signal receiving)" sequence indicating a state in which the terminal 11 receives signals, a "Communication (communication state)" sequence indicating the communication state of the terminal 11, a "UE (user equipment) Release (terminal disconnection)" sequence indicating the disconnection state of the terminal 11, and an "NW (network) Release (connection destination disconnection)" sequence indicating a disconnection state from the virtual connection destination 12.

The series of sequence is displayed in a flowchart shape along arrows indicating each communication procedure and the transition direction of the communication state between the sequences under the control of the display control unit 5. At that time, the display state is changed depending on the transition state. That is, when the corresponding sequence is in the transition state, a display state different from the display state until that time, for example, a display color or display brightness is changed to display the corresponding sequence.

In FIG. 3, the arrow between the sequences on the sequence display unit 6a indicates each communication procedure and the transition direction of the communication state.

The connection state display unit 6b displays the state of connection between the terminal 11 and the virtual connection destination 12 (the virtual communication destination 12a, the virtual server 12b, and the virtual TV phone 12c) through the test device 1.

Specifically, the connection state display unit 6b displays the terminal 11, the pseudo base station control unit 4, and the virtual connection destination 12 (the virtual communication destination 12a, the virtual server 12b, and the virtual TV phone 12c) as icons, changes the display state according to whether the units are connected, and displays, as figures, a plurality of connection lines indicating the connection between the pseudo base station control unit 4, and the terminal 11 and the virtual connection destination 12 (the virtual communication destination 12a, the virtual server 12b, and the virtual TV phone 12c) under the control of the display control unit 5. That is, the display color or display brightness of the corresponding connection line is changed according to whether the unit is connected.

The connection destination display unit 6c displays, as an icon, one virtual connection destination 12 (any one of the virtual communication destination 12a, the virtual server 12b, and the virtual TV phone 12c) which is connected to the terminal 11 through the pseudo base station control unit 4.

The sequence display unit 6a, the connection state display unit 6b, and the connection destination display unit 6c have the same structure as those disclosed in Patent Document 1 and the detailed description thereof will not be repeated.

When the terminal 11 performs multiplex communication, the multiplex communication related display unit 6d displays, as the multiplex communication related information determined by the display information determining unit 13, the above-mentioned Priority, Status, PDN/PDP-Type, IP-version, QCI, EBI/NSAPI, Linked-EBI/Linked-NSAPI, UE-Address, DNS-Address, and Access-Point-Name, for example, in a list form shown in FIG. 3 under the control of the display control unit 5 through the pseudo base station control unit 4 such that the user can know the settings of multiplex communication or the state of multiplex communication during the test.

Next, the display process operation of the test device 1 having the above-mentioned structure will be described with reference to the flowcharts shown in FIGS. 4 to 6. First, the procedure of a display process when the test device 1 sends signals will be described with reference to the flowchart shown in FIG. 4.

In the test device 1, when a packet is transmitted from the transmitting and receiving unit 3 to the terminal 11 under the control of the pseudo base station control unit 4 (ST1), the display control unit 5 acquires information which is set in advance to the test device 1 by an operation input through the operation unit 2 among the information item displayed on the display unit 6 through the pseudo base station control unit 4 (ST2). Then, in the test device 1, the transmitting and receiving unit 3 receives the packet which is transmitted as a response from the terminal 11 (ST3). Then, in the test device 1, the display control unit 5 acquires information included in the packet from the terminal 11 among the information items displayed on the display unit 6 through the pseudo base station control unit 4 (ST4). Then, in the test device 1, the display control unit 5 acquires information which is determined by the display information determining unit 13 on the basis of the information included in the packet from the terminal 11 among the information items displayed on the display unit 6 through the pseudo base station control unit 4 (ST5). Then, the display unit 6 displays the information acquired by the display control unit 5, for example, in the display format shown in FIG. 3 (ST6).

Next, the procedure of a display process when the terminal 11 sends signals will be described with reference to the flowchart shown in FIG. 5.

In the test device 1, when the transmitting and receiving unit 3 receives the packet transmitted by the terminal 11 under the control of the pseudo base station control unit 4 (ST11), the display control unit 5 acquires information included in the packet from the terminal 11 among the information items displayed on the display unit 6 through the pseudo base station control unit 4 (ST12). Then, in the test device 1, the display control unit 5 acquires information which is set to the test device 1 in advance among the information items displayed on the display unit 6 through the pseudo base station control unit 4 (ST13). Then, in the test device 1, the display control unit 5 acquires information which is determined by the display information determining unit 13 on the basis of the information included in the packet from the terminal 11 among the information items displayed on the display unit 6 through the pseudo base station control unit 4 (ST14). Then, the display unit 6 displays the information acquired by the display control unit 5, for example, in the display format shown in FIG. 3 (ST15).

Next, a Linked-NSAPI determining process (when there is no information directly indicating dependency) when the terminal 11 sends signals will be described with reference to the flowchart shown in FIG. 6.

In the test device 1, when the transmitting and receiving unit 3 receives the packet of the primary PDP transmitted by the terminal 11 under the control of the pseudo base station control unit 4 (ST21), the Linked-EBI/Linked-NSAPI determining unit 13g of the display information determining unit 13 acquires the values of NSAPI and TI from the received packet (ST22). Then, in the test device 1, when the transmitting and receiving unit 3 receives the packet of the secondary PDP transmitted by the terminal 11 (ST23), the Linked-EBI/Linked-NSAPI determining unit 13g of the display information determining unit 13 acquires the values of NSAPI and TI from the received packet (ST24). Then, the Linked-EBI/Linked-NSAPI determining unit 13g of the display information determining unit 13 searches for the primary PDP having the value of TI equal to the value of Linked-TI and determines the value of NSAPI of the primary PDP to be the value of Linked-NSAPI of the secondary PDP (ST25). Then, the Linked-EBI/Linked-NSAPI determining unit 13g of the display information determining unit 13 outputs the determined value of the Linked-NSAPI to the display control unit 5 (ST26).

The display process operation of the test device 1 according to this embodiment is not limited to the procedure of the processes shown in FIGS. 4 to 6, but the operation of the processes may be changed or some of the processes may be omitted.

As such, according to the test device and the test method according to the invention, since the multiplex communication related display unit 6d for displaying information about the set PDP or PDN and the state thereof in a list form is newly provided, it is possible to visually check the settings of multiplex communication or the state of multiplex communication during the test. In addition, since information indicating the dependency of multiplex communication is also displayed, it is possible to check the settings of multiplex communication or the state of multiplex communication during the test and easily test the multiplex communication of the terminal.

In the test device and the test method according to the invention, for example, even when there is no information directly indicating the dependency of multiplex communication as in GSM or W-CDMA, the dependency of multiplex communication is determined on the basis of the set information or information notified by the terminal and is displayed on the multiplex communication related display unit 6d such that the tester can know the dependency. In this way, the tester can know the dependency of multiplex communication and easily test the multiplex communication of the terminal.

In the above-mentioned embodiment, multiplex communication based on the communication standards GSM/W-CDMA and LTE has been described. However, the communication standard is not limited thereto. For example, the structure and method according to invention can be applied to other communication standards, such as CDMA2000, TD-SCDMA, WiMAX, and Wi-Fi.

DESCRIPTION OF REFERENCE NUMERALS AND SIGNS

1: TEST DEVICE
2: OPERATION UNIT
3: TRANSMITTING AND RECEIVING UNIT
4: PSEUDO BASE STATION CONTROL UNIT
5: DISPLAY CONTROL UNIT
6: DISPLAY UNIT
6a: SEQUENCE DISPLAY UNIT
6b: CONNECTION STATE DISPLAY UNIT
6c: CONNECTION DESTINATION DISPLAY UNIT
6d: MULTIPLEX COMMUNICATION RELATED DISPLAY UNIT
11: TERMINAL (MOBILE COMMUNICATION TERMINAL)
12: VIRTUAL CONNECTION DESTINATION
13: DISPLAY INFORMATION DETERMINING UNIT

The invention claimed is:

1. A mobile communication terminal test device comprising:
   a transmitting and receiving unit that transmits and receives an RF signal to and from a mobile communication terminal, which is a test target;
   a pseudo base station control unit that simulates an operation of a base station;
   a display unit that displays information about communication performed by the mobile communication terminal; and
   a display control unit,
   wherein, when the mobile communication terminal performs multiplex communication of packet data communication with a connection destination through the transmitting and receiving unit and the pseudo base station control unit, the display control unit displays a list of multiplex communication related information including an address of the mobile communication terminal and information for identifying the connection destination on the display unit.

2. The mobile communication terminal test device according to claim 1, further comprising:
   a virtual connection destination that simulates the connection destination,
   wherein the display control unit displays dependency of the packet data communication for each service by logical connection between the mobile communication terminal and the virtual connection destination on the display unit.

3. The mobile communication terminal test device according to claim 2,
   wherein the pseudo base station control unit includes a display information determining unit that determines the dependency on the basis of information included in a packet for each service from the mobile communication terminal.

4. The mobile communication terminal test device according to claim 3,
   wherein the multiplex communication is a combination of first packet data communication which transmits control information for a predetermined service and second packet data communication which transmits data for the predetermined service,
   the information included in the packet for each service includes a first identifier for identifying a process and a second identifier for identifying the relation of the process, and
   when a value of the first identifier included in the first packet data communication is equal to a value of the second identifier included in the second packet data communication, the display information determining unit determines that the dependency is established between the first packet data communication and the second packet data communication.

5. The mobile communication terminal test device according to claim 4,
   wherein the mobile communication terminal performs communication based on a W-CDMA communication standard,
   the first identifier is a TI (Transaction Identifier), and
   the second identifier is a Linked-TI.

6. The mobile communication terminal test device according to claim 1, wherein the multiplex communication of packet data communication relates to a plurality of different concurrent communication operations between the pseudo base station, the mobile communication terminal, and the connection destination or a plurality of connection destinations.

7. A mobile communication terminal test method that tests whether a mobile communication terminal performs packet data communication with a connection destination normally, comprising:
   a step of simulating an operation of a base station and performing communication with a mobile communication terminal, which is a test target; and
   a step of displaying information about communication performed by the mobile communication terminal,
   wherein, when the mobile communication terminal performs multiplex communication of the packet data communication with the connection destination in the communication step, the display step displays a list of multiplex communication related information including an address of the mobile communication terminal and information for identifying the connection destination.

8. The mobile communication terminal test method according to claim 7,
wherein the display step displays the dependency of the packet data communication for each service by logical connection between the mobile communication terminal and a virtual connection destination which simulates the connection destination.

9. The mobile communication terminal test method according to claim 8, further comprising:
a step of determining the dependency on the basis of information included in a packet for each service from the mobile communication terminal.

10. The mobile communication terminal test method according to claim 9,
wherein the multiplex communication is a combination of first packet data communication which transmits control information for a predetermined service and second packet data communication which transmits data for the predetermined service,
the information included in the packet for each service includes a first identifier for identifying a process and a second identifier for identifying the relation of the process, and
when a value of the first identifier included in the first packet data communication is equal to a value of the second identifier included in the second packet data communication, the dependency determining step determines that the dependency is established between the first packet data communication and the second packet data communication.

11. The mobile communication terminal test method according to claim 10,
wherein the mobile communication terminal performs communication based on a W-CDMA communication standard,
the first identifier is a TI (Transaction Identifier), and
the second identifier is a Linked-TI.

12. The mobile communication terminal test method according to claim 7, wherein the multiplex communication of packet data communication relates to a plurality of different concurrent communication operations between the pseudo base station, the mobile communication terminal, and the connection destination or a plurality of connection destinations.

* * * * *